US009814107B2

(12) United States Patent
Dai et al.

(10) Patent No.: US 9,814,107 B2
(45) Date of Patent: Nov. 7, 2017

(54) DRIVE CIRCUIT AND ILLUMINATION DEVICE COMPRISING THE DRIVE CIRCUIT

(71) Applicant: OSRAM GmbH, Munich (DE)

(72) Inventors: Yongchang Dai, Shenzhen (CN); Daxin Lin, Shenzhen (CN)

(73) Assignee: OSRAM GmbH, Munich (DE)

( * ) Notice: Subject to any disclaimer, the term of this patent is extended or adjusted under 35 U.S.C. 154(b) by 73 days.

(21) Appl. No.: 14/631,887

(22) Filed: Feb. 26, 2015

(65) Prior Publication Data
US 2016/0255684 A1 Sep. 1, 2016
US 2017/0273151 A9 Sep. 21, 2017

(30) Foreign Application Priority Data
Feb. 26, 2014 (CN) .......................... 2014 1 0066712

(51) Int. Cl.
H05B 37/00 (2006.01)
H05B 33/08 (2006.01)
H05B 37/02 (2006.01)

(52) U.S. Cl.
CPC ..... H05B 33/0815 (2013.01); H05B 33/0845 (2013.01); Y02B 20/347 (2013.01)

(58) Field of Classification Search
CPC ...... H05B 33/089; H05B 41/36; H02M 3/335
(Continued)

(56) References Cited

U.S. PATENT DOCUMENTS 7,071,905 B1* 7/2006 Fan .................. G09G 3/3233
315/169.3
7,912,379 B2* 3/2011 Hase .................. H04B 10/502
315/224
(Continued)

FOREIGN PATENT DOCUMENTS

DE 102011016802 A1 10/2012

OTHER PUBLICATIONS

Author:Megerle Walter, Title Controldevice for use in LED illumination device, has generating unit producing and supplying control signal to MOSFET, and limiting unit detecting current through LEDs and Influencing device based on detected current to limit current, Date: Oct. 18, 2012.*
(Continued)

Primary Examiner — Douglas W Owens
Assistant Examiner — Wei Chan
(74) Attorney, Agent, or Firm — Viering, Jentschura & Partner mbB

(57) ABSTRACT

Various embodiments may relate to a drive circuit of an illumination device. The drive circuit has an output terminal connected to a load of the illumination device. The drive circuit includes a power supply, a boost control unit connected to an output terminal of the power supply, a main control unit connected to the boost control unit, and a load current control unit connected between the main control unit and the load, and including a switch unit. The switch unit includes a first sub switch unit, which is configured to switch according to a dimming control signal from the main control unit, and further includes a second sub switch unit connected to the first sub switch unit. The second sub switch unit is configured to be turned on in a situation where the first sub switch unit is turned on so as to turn off the first sub switch unit.

12 Claims, 3 Drawing Sheets

(58) Field of Classification Search
USPC ........ 315/291, 122, 200 R, 205, 207; 363/16
See application file for complete search history.

(56) References Cited

U.S. PATENT DOCUMENTS

| | | | | |
|---|---|---|---|---|
| 8,749,163 B2* | 6/2014 | Phadke | .............. | H05B 33/0887 315/185 S |
| 8,922,135 B2* | 12/2014 | Sumitani | ............ | H05B 33/0815 315/201 |
| 2005/0162096 A1* | 7/2005 | Bertrand | ............ | H05B 33/0809 315/291 |
| 2005/0231133 A1* | 10/2005 | Lys | ........................ | F21S 48/325 315/291 |
| 2006/0071614 A1* | 4/2006 | Tripathi | ............. | H05B 33/0815 315/291 |
| 2007/0171946 A1* | 7/2007 | Hase | ..................... | H04B 10/508 372/29.02 |
| 2008/0224636 A1* | 9/2008 | Melanson | .......... | H05B 33/0815 315/307 |
| 2009/0033236 A1* | 2/2009 | Alexandrov | ....... | H05B 41/2827 315/224 |
| 2010/0327765 A1* | 12/2010 | Melanson | ........... | H02M 3/3374 315/291 |
| 2011/0127921 A1* | 6/2011 | Lin | .................... | H05B 33/0827 315/192 |
| 2011/0227493 A1 | 9/2011 | Du et al. | | |
| 2012/0025724 A1* | 2/2012 | Melanson | ............... | H02M 1/36 315/201 |
| 2013/0234621 A1* | 9/2013 | Athalye | ................ | H02M 3/158 315/307 |
| 2015/0002033 A1* | 1/2015 | Liu | .................... | H05B 33/0809 315/187 |
| 2015/0180325 A1* | 6/2015 | Liang | ................ | H02M 3/33546 363/21.09 |

OTHER PUBLICATIONS (Translation) Author:Megerle Walter, Title Controldevice for use in LED illumination device, has generating unit producing and supplying control signal to MOSFET, and limiting unit detecting current through LEDs and Influencing device based on detected current to limit current, Date: Oct. 18, 2012.*

European Search Report based on Application No. EP141962718 (7 Pages) dated Jul. 27, 2015.

* cited by examiner

DRIVE CIRCUIT AND ILLUMINATION DEVICE COMPRISING THE DRIVE CIRCUIT

CROSS-REFERENCE TO RELATED APPLICATION

This application claims priority to Chinese Patent Application Serial No. 2014 100 66 712.3 which was filed Feb. 26, 2014, and is incorporated herein by reference in its entirety.

TECHNICAL FIELD

Various embodiments relate generally to a drive circuit used in an illumination device, especially an LED illumination device, and an illumination device including the drive circuit.

BACKGROUND

With the rapid development of the illumination devices, especially the LED illumination devices with high efficiency and low energy, various lamps using the LED technology have been widely used in various aspects of the daily life, such as indoor lighting or lighting in the public place. As a result, the users' requirement to the electrical performance, the mechanical performance, and the illumination effect of the LED illumination device are also increased. At present, due to the requirement to the product cost in the market, the LED drive circuit operating according to the phase-cut dimming principle has been widely used. The LED drive circuit with the phase-cut dimming function should have good and highly effective dimming performance and low cost. The dimming drive circuit for the LED illumination device in the related art usually is designed having the boost and buck topology pattern. Although the drive circuit designed according to such structure has the performance meeting the design requirement, the material cost of the illumination device having such drive circuit is relatively high, resulting in high price illumination device.

SUMMARY

Various embodiments relate to a drive circuit of an illumination device and an illumination device including the drive circuit, wherein the drive circuit has an output terminal connected to a load of the illumination device, the drive circuit includes a power supply, a boost control unit connected to an output terminal of the power supply, a main control unit connected to the boost control unit, and a load current control unit connected between the main control unit and the load, and the load current control unit includes a switch unit, wherein the switch unit includes a first sub switch unit, wherein the first sub switch unit is configured to switch according to a dimming control signal from the main control unit, and the switch unit further includes a second sub switch unit connected to the first sub switch unit, wherein the second sub switch unit is configured to be turned on in a situation where the first sub switch unit is turned on so as to turn off the first sub switch unit and thereby to maintain the peak of the current flowing through the first sub switch unit and to adjust the mean value of the current.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
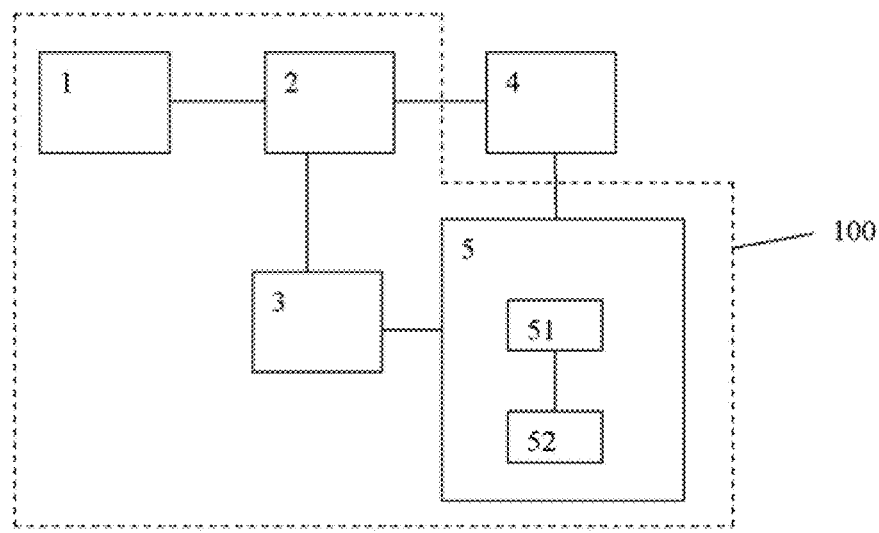
FIG. 1 shows a schematic diagram of the function block of an illumination device according to an embodiment.

The following detailed description refers to the accompanying drawings that show, by way of illustration, specific details and embodiments in which the invention may be practiced.

Various embodiments provide a drive circuit for an illumination device and an illumination device including the drive circuit. The drive circuit according to various embodiments has a simple structure design and a small quantity of components, suits the trend of the LED design with application of high forward voltage and low current, and has good and highly effective dimming performance. In addition, this drive circuit has a low cost due to its simple circuit structure, and the illumination device using this drive circuit may have a low cost.

Various embodiments provide a drive circuit of an illumination device, wherein the drive circuit has an output terminal connected to a load of the illumination device, the drive circuit includes a power supply, a boost control unit connected to an output terminal of the power supply, a main control unit connected to the boost control unit, and a load current control unit connected between the main control unit and the load, and the load current control unit includes a switch unit, wherein the switch unit includes a first sub switch unit, wherein the first sub switch unit is configured to switch according to a dimming control signal from the main control unit, and the switch unit further includes a second sub switch unit connected to the first sub switch unit, wherein the second sub switch unit is configured to be switched on in a situation that the first sub switch unit is switched on so as to switch off the first sub switch unit and thereby to maintain the peak of the current passing through the first sub switch unit and to adjust the mean value of the current. According to the drive circuit of various embodiments, by utilizing the interaction of the first sub switch unit and the second sub switch unit, i.e., turn-on of the first sub switch unit enabling turn-on of the second sub switch, and turn-on of the second sub switch enabling turn-off of the first sub switch unit, the current passing through the load such as LED string can be maintained, and the mean value of the current passing through the load also can be adjusted without reducing the load voltage, such that the total power of the load is reduced to achieve for instance adjustment of the light intensity of the LED lamp.

According to an example of various embodiments, the main control unit may adjust the mean value by adjusting the duty cycle of the dimming control signal. A duty cycle of a current signal flowing through the load also may be adjusted by reducing the duty cycle of the dimming control signal, such that the mean value of this current signal is also adjusted so as to adjust for instance the light intensity of the LED load in a highly effective signal control manner.

According to an embodiment of various embodiments, the second sub switch unit may be connected between the first sub switch unit and ground. Once the second sub switch unit is turned on, the second sub switch unit can enable the drive signal of the first sub switch unit to be grounded so as to turn off the first sub switch unit, in this way, the second sub switch unit may be driven by the current signal to turn on when for instance the current signal flowing through the load or the first sub switch unit exceeds a predetermined value, such that the first sub switch unit is turned off, and interaction of the first sub switch unit and the second sub switch unit is formed.

The dimming control signal may be configured as a PWM signal. The PWM signal, i.e., pulse width modulation signal, has a duty cycle adjustable according to requirements, and compared with a constant current control manner, the control efficiency of the drive circuit is greatly increased, and energy may be saved and the power consumption may be reduced effectively.

According to an embodiment of various embodiments, the load current control unit may further include a voltage detection unit which is configured to detect the voltage at the output terminal of the load and feed back it to the main control unit so as to adjust the output power of the boost control unit. The voltage detection unit detects the voltage at the negative end of the load (i.e., the end of the load connected with the ground), but not the positive end of the load (i.e., the end of the load connected with the power supply), thus, it may avoid the reduction of the voltage detection efficiency caused by change of the operation of the LED, for example, change of the LED voltage or change of the operation temperature, so as to ensure capability of detecting the voltage at the negative end of the load in a highly effective manner.

According to an embodiment of various embodiments, the drive circuit may further include an auxiliary power supply unit which is connected to an input terminal of the load and configured to supply power to the main control unit. This auxiliary power supply unit may act as an auxiliary power supply of the main control unit.

The voltage detection unit may include a first resistor, a second resistor, and a first capacitor in parallel connection with the second resistor, wherein the first resistor has an end connected to a node between the load and the switch unit, and the other end of the first resistor connected to the main control unit, and the second resistor is connected between the said other end of the first resistor and ground. The voltage detection unit according to this design has a simple circuit structure, may effectively detect the voltage signal of the load, and feeds back this voltage signal to the main control unit.

The first sub switch unit may include a first transistor and a third resistor, wherein the third resistor has an end connected to the control electrode of the first transistor, and the other end of the third resistor connected to the main control unit, and the second sub switch unit includes a second transistor, a fourth resistor, a fifth resistor, and a first diode, wherein the reference electrode of the second transistor is grounded, the fourth resistor has an end connected to a control electrode of the second transistor, and the other end of the fourth resistor connected to the node between the reference electrode of the first transistor and the anode of the first diode, and the cathode of the first diode is grounded through the fifth resistor. The first sub switch unit and the second sub switch unit according to this design have simple circuit structures and a low cost, maintain, in a highly effective manner, the peak of the current signal flowing through the load and the reference electrode and the working electrode of the first sub switch unit, and adjust the duty cycle and the mean value of the current signal.

The first transistor may be a power MOSFET, and the second transistor may be a bipolar transistor. The dimming control signal from the main control unit is directly used for driving the power MOSFET, and turns off the MOSFET which is configured as the first transistor via switching on of the bipolar transistor, so as to achieve highly effective dimming and low manufacture cost.

According to an embodiment of various embodiments, the load may be configured as an LED string including at least one LED. As a light source, the LED has the advantages such as high efficiency and low energy consumption, and may change its brightness in a situation where the load current control unit provides a current signal with a changed duty cycle, without affecting the color temperature.

Various embodiments further provide an illumination device which includes the drive circuit according to the above. The illumination device according to various embodiments has a highly effective dimming effect, a simple circuit structure, a small quantity of components, and a low cost.

Figure 2:
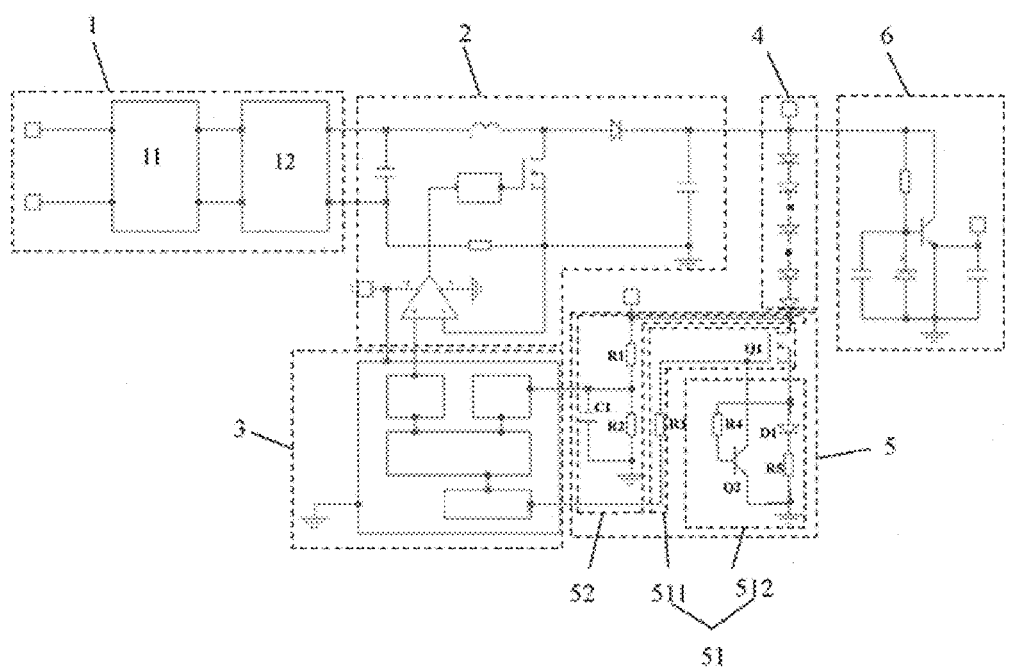
FIG. 2 shows a schematic diagram of the circuit structure of the illumination device according to an embodiment.

FIG. 1 shows a schematic diagram of a functional block of an illumination device 200 according to an embodiment. The illumination device 200 according to various embodiments includes a drive circuit 100 and a load 4 connected to an output terminal of the drive circuit 100, wherein the drive circuit 100 includes a power supply 1, a boost control unit 2 connected to an output terminal of the power supply 1, a main control unit 3 connected to the boost control unit 2, and a load current control unit 5 connected between the load 4 and the main control unit 3, and the load 4 is connected to the output terminal of the drive circuit 100. The power supply 1 may for instance include an EMI filter 11 and a rectifier bridge 12. Besides, the illumination device 200 is further provided with an auxiliary power supply unit 6 connected to the load 4, specifically to an input terminal or a positive terminal of the load 4 (i.e., the terminal of the load 4 connected with the power supply 1), and this auxiliary power supply unit 6 is used to supply auxiliary power or back power to the main control unit 3, wherein the load current control unit 5 further includes a switch unit 51 and a voltage detection unit 52 which is capable of feeding back a voltage detected of the load 4 to the main control unit 3, and the boost control unit 2 is capable of increasing an output power thereof according to a control signal of the main control unit 3 so as to for example increase the voltage of the load 4. The switch unit 51 is capable of adjusting the power of the load 4 according to a dimming control signal of the main control unit 3 so that the switch unit 51 may adjust the lighting intensity of an LED lamp, when the load 4 is configured as the LED lamp, so as to achieve the dimming purpose FIG. 2 shows a schematic diagram of a circuit structure of the illumination device 200 according to an embodiment. According to the embodiment, the switch unit 51 includes a first sub switch unit 511 and a second sub switch unit 512. The first sub switch unit 511 includes a first transistor Q1 configured as power MOSFET and a third resistor R3 connected to a control electrode (i.e., gate) of the power MOSFET, wherein the other end of the third resistor R3 is connected to the main control unit 3. The main control unit 3 herein may be configured as a microcontroller, a programmable controller, or a similar processor. The second sub switch unit 512 includes a first diode D1 connected to a reference electrode (i.e., source) of the power MOSFET and a fifth resistor R5, a second transistor Q2 connected to the gate of the power MOSFET, and a fourth resistor R4 connected to a control electrode of the second transistor Q2, and wherein the second transistor Q2 is configured as a bipolar transistor which has a base connected via the fourth resistor R4 to a node between an anode of the first diode D1 and the source of the power MOSFET, a collector connected to the gate of the power MOSFET, and an emitter grounded. The first diode D1 in series connection with the fifth resistor R5 is provided in order to compensate increase of the voltage of the base of the bipolar transistor caused by increase of the temperature of the drive circuit 100. Herein, according to requirements of practical application, the first transistor Q1 also can be configured as for instance a bipolar transistor or a similar electronic switch component, and the second transistor Q2 is configured as for instance a MOS or a similar electronic switch component.

As show in FIG. 2, the voltage detection unit 52 comprises a first resistor R1, a second resistor R2, and a first capacitor C1, wherein the first capacitor C1 is configured in parallel connection with the second resistor R2, and the first resistor R1 has one end grounded via series connection with the second resistor R2, and the other end connected to an output terminal or a negative terminal of the load 4 (i.e., the terminal of the load which is connected with ground) which is for example configured as an LED string, and wherein an intermediate node between the first resistor R1 and the second resistor R2 is connected to the main control unit 3. Thereby, the voltage detection unit 52 is capable of feeding back, through the first resistor R1, a voltage signal detected of the output terminal of the LED string to the main control unit 3. Generally, the main control unit 3 will hold this voltage signal at 1.2V. When the drive circuit 100 enters into a dimming state, in order to maintaining this voltage signal, the main control unit 3 will increase the duty cycle of the reference voltage provided by the main control unit 3 to the boost control unit 2, and when this duty cycle reaches the maximum, the main control unit 3 will for instance reduce, through the first resistor R3, a duty cycle of a PWM signal provided to the first transistor Q1, so as to reduce the mean value of the current passing through the LED string to control the dimming of the LED string.

According to the circuit design in FIG. 2, the main control unit 3 can send, through the third resistor R3, a dimming control signal configured as PWM to the first transistor Q1 to control on and off of the first transistor Q1. When the first transistor Q1 is turned on according to a drive signal, a current signal can pass through the drain and the source of the power MOSFET after flowing through the LED string, in this way the LED string is lightened to emit light; after passing through the drain and the source of the power MOSFET, the current drives on and off of the bipolar transistor through the fourth resistor R4, when the bipolar transistor is turned on, the gate of the power MOSFET is grounded through the bipolar transistor, and in this way, the second transistor Q2 also can be turned on when the first transistor Q1 is turned on, and then turns off the first transistor Q1. As a result, when the drive circuit 100 enters into the dimming state, the first transistor Q1 can be turned on or turned off according to the dimming control signal of the main control unit 3 and switching of the second transistor Q2. Therefore, the first sub switch unit 511 and the second sub switch unit 512 can interact to achieve adjustment of the duty cycle of the current signal passing through the LED string, and also can maintain the current peak of the current signal flowing through the LED string before and after the drive circuit 100 enters into the dimming state. By setting a resistance value of the fifth resistor R5 suitably, the drive circuit 100 can effectively control on and off of the power MOSFET, and hold the current flowing through the LED string at a required value.

Figure 3:
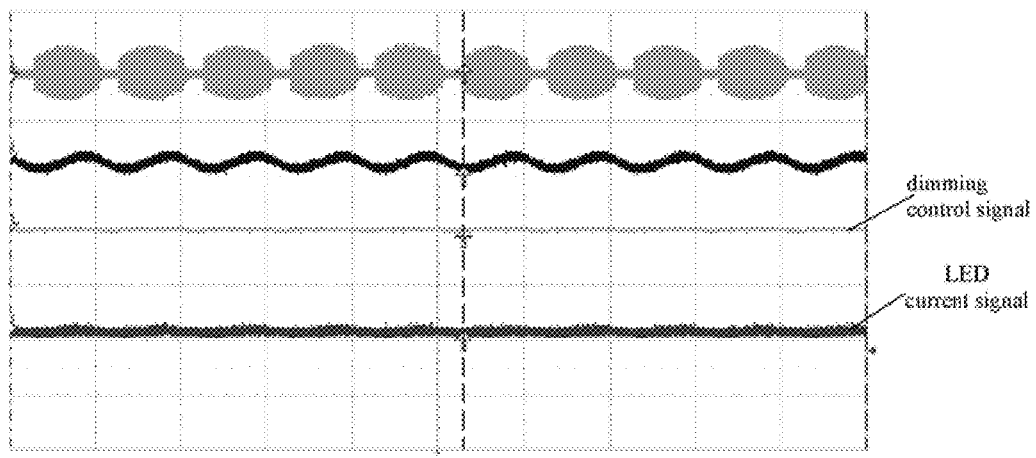
FIG. 3 shows a schematic diagram of waveforms of the dimming control signal and the current signal of LED before the illumination device according to an embodiment enters into the dimming state.
Figure 4:
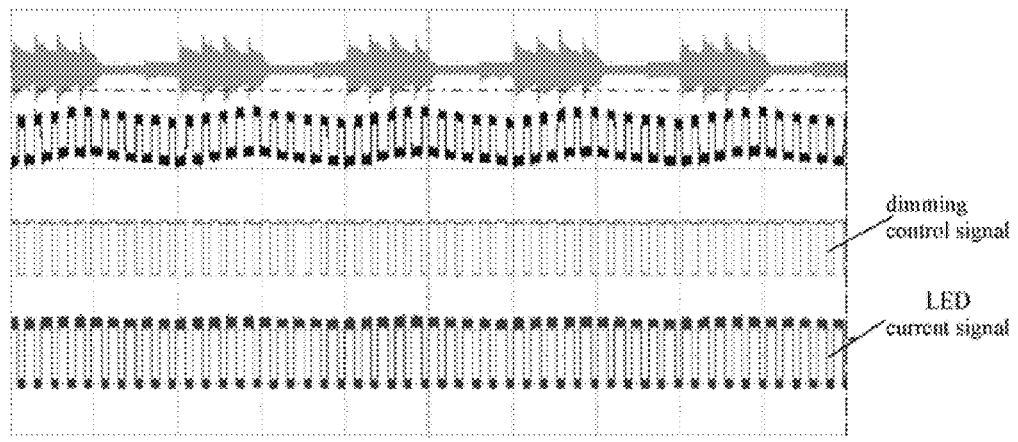
FIG. 4 shows a schematic diagram of waveforms of a dimming control signal and a current signal of LED when the illumination device according to an embodiment enters into the dimming state.

FIG. 3 shows a schematic diagram of waveforms of the dimming control signal and the current signal of LED before the illumination device 200 according to an embodiment enters into the dimming state; and FIG. 4 shows a schematic diagram of waveforms of a dimming control signal and a current signal of LED when the illumination device 200 according to an embodiment enters into a dimming state. As shown in FIG. 3, when the drive circuit 100 does not enter into the dimming state, the dimming control signal is represented as a constant current signal, and the current signal of the LED lamp is also a constant current signal correspondingly. As shown in FIG. 4, when the drive circuit 100 enters into the dimming state, the dimming control signal provided by the main control unit 3 becomes a PWM signal with a certain duty cycle, and the current signal of the LED lamp is also correspondingly converted to a PWM signal with a certain duty cycle, wherein the peak of the current signal of the LED lamp is not changed, but has a reduced mean value due to the duty cycle.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A drive circuit of an illumination device, wherein the drive circuit has an output terminal connected to a load of the illumination device, the drive circuit comprising: a power supply, a boost control unit connected to an output terminal of the power supply, a main control unit connected to the boost control unit, and a load current control unit connected between the main control unit and the load, and comprising a switch unit, wherein the switch unit comprises a first sub switch unit, wherein the first sub switch unit is configured to switch according to a dimming control signal from the main control unit, and the switch unit further comprises a second sub switch unit connected to the first sub switch unit, wherein the second sub switch unit is configured to be switched on in a situation where the first sub switch unit is switched on so as to switch off the first sub switch unit and thereby to maintain the peak of the current flowing through the first sub switch unit and to adjust the mean value of the current, wherein the first sub switch unit comprises a first transistor and a third resistor, wherein the third resistor has an end connected to the control electrode of the first transistor, and the other end of the third resistor is connected to the main control unit, and the second sub switch unit comprises a second transistor, a fourth resistor, a fifth resistor, and a first diode, wherein the reference electrode of the second transistor is grounded, the fourth resistor has an end connected to the control electrode of the second transistor, and the other end of the fourth resistor is connected to the node between the reference electrode of the first transistor and the anode of the first diode, and the cathode of the first diode is grounded through the fifth resistor.

2. The drive circuit according to claim 1, wherein the main control unit adjusts the mean value by adjusting the duty cycle of the dimming control signal.

3. The drive circuit according to claim 1, wherein the second sub switch unit is connected between the first sub switch unit and ground.

4. The drive circuit according to claim 1, wherein the dimming control signal is configured as a PWM signal.

5. The drive circuit according to claim 1, wherein the load current control unit further comprises a voltage detection unit which is configured to detect the voltage at the output terminal of the load and feed back the voltage to the main control unit so as to adjust the output power of the boost control unit.

6. The drive circuit according to claim 1, wherein the drive circuit further comprises an auxiliary power supply unit which is connected to an input terminal of the load and configured to supply power to the main control unit.

7. The drive circuit according to claim 5, wherein the voltage detection unit comprises a first resistor, a second resistor, and a first capacitor in parallel connection with the second resistor, wherein the first resistor has an end connected to a node between the load and the switch unit, and the other end of the first resistor is connected to the main control unit, and the second resistor is connected between the said other end of the first resistor and ground.

8. The drive circuit according to claim 1, wherein the first transistor is a power MOSFET, and the second transistor is a bipolar transistor.

9. The drive circuit according to claim 1, wherein the load is configured as an LED string comprising at least one LED.

10. The drive circuit according to claim 2, wherein the dimming control signal is configured as a PWM signal.

11. The drive circuit according to claim 3, wherein the dimming control signal is configured as a PWM signal.

12. An illumination device, comprising a drive circuit, the drive circuit comprising: a power supply, a boost control unit connected to an output terminal of the power supply, a main control unit connected to the boost control unit, and a load current control unit connected between the main control unit and the load, and comprising a switch unit, wherein the switch unit comprises a first sub switch unit, wherein the first sub switch unit is configured to switch according to a dimming control signal from the main control unit, and the switch unit further comprises a second sub switch unit connected to the first sub switch unit, wherein the second sub switch unit is configured to be switched on in a situation where the first sub switch unit is switched on so as to switch off the first sub switch unit and thereby to maintain the peak of the current flowing through the first sub switch unit and to adjust the mean value of the current, wherein the first sub switch unit comprises a first transistor and a third resistor, wherein the third resistor has an end connected to the control electrode of the first transistor, and the other end of the third resistor is connected to the main control unit, and the second sub switch unit comprises a second transistor, a fourth resistor, a fifth resistor, and a first diode, wherein the reference electrode of the second transistor is grounded, the fourth resistor has an end connected to the control electrode of the second transistor, and the other end of the fourth resistor is connected to the node between the reference electrode of the first transistor and the anode of the first diode, and the cathode of the first diode is grounded through the fifth resistor.

* * * * *